United States Patent [19]

Bury et al.

[11] 3,928,894

[45] Dec. 30, 1975

[54] ADHESIVE MOUNTING DEVICE

[75] Inventors: George John Bury, Lake Villa; Edwin Grant Swick, Bartlett, both of Ill.

[73] Assignee: Illinois Tool Works Inc., Chicago, Ill.

[22] Filed: Nov. 26, 1974

[21] Appl. No.: 527,331

[52] U.S. Cl. ............................. 24/73 VA; 248/224
[51] Int. Cl.² ..................... A44B 21/00; A47G 1/16
[58] Field of Search ............ 248/467, 475 R, 475 B, 248/495, 223, 224; 24/73 VA, 73 RM, 73 MF

[56] References Cited
UNITED STATES PATENTS

| 1,030,090 | 6/1912 | Johnson | 248/224 UX |
| 1,720,309 | 7/1929 | Wakefield | 248/224 X |
| 1,794,700 | 3/1931 | McCaskey | 248/224 |
| 2,200,158 | 5/1940 | Clarke | 248/224 X |
| 2,239,978 | 4/1941 | Sanford | 248/224 |
| 2,742,984 | 4/1956 | Bedford | 24/73 MF X |
| 2,771,263 | 11/1956 | Boho | 248/224 X |
| 3,074,680 | 1/1963 | Stewart | 248/224 X |
| 3,131,251 | 4/1964 | Ryan | 248/475 R X |
| 3,189,187 | 6/1965 | Guyer et al. | 248/223 X |
| 3,848,843 | 11/1974 | Levy | 248/224 |

Primary Examiner—Donald A. Griffin
Attorney, Agent, or Firm—Robert W. Beart; Thomas W. Buckman

[57] ABSTRACT

A clip and mounting system utilizing such a clip designed to adhesively mount devices to a surface, such as a windshield. The system includes a mounting member adapted to be slid over and clamped to a base plate member which is bonded to the surface. The system includes spring means which permits differential expansion between the members without significantly altering the clamping load between the members and the stress on the adhesive bond.

11 Claims, 11 Drawing Figures

U.S. Patent  Dec. 30, 1975  3,928,894
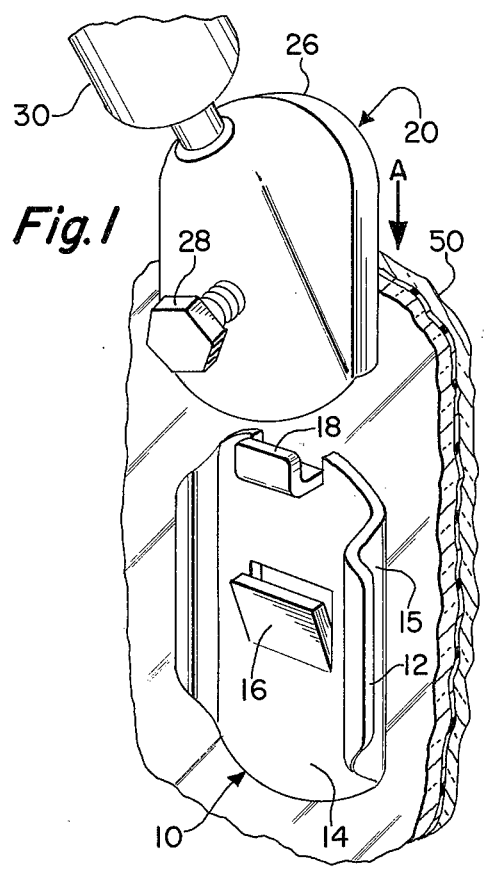
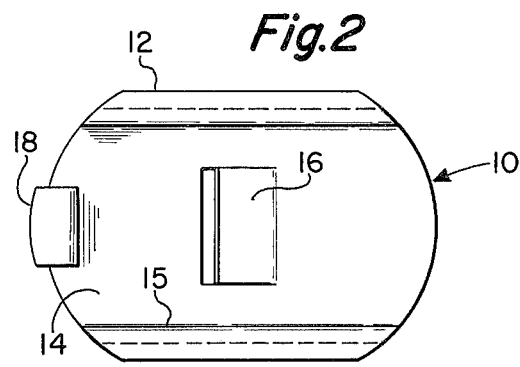
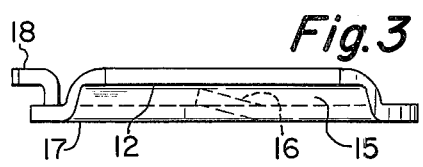
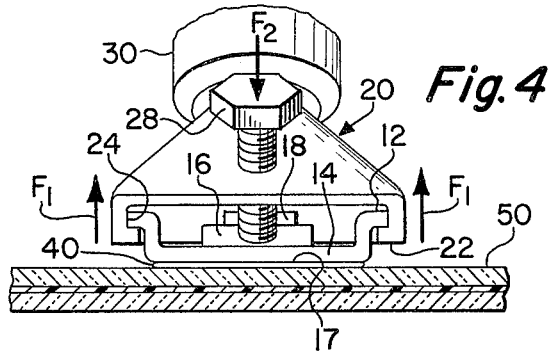
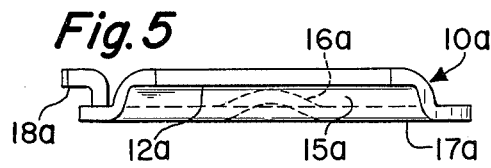
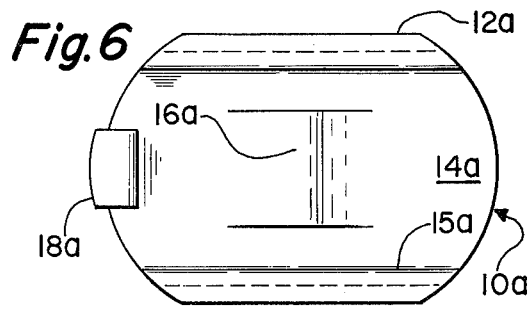
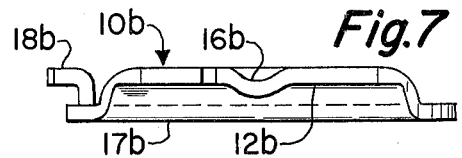
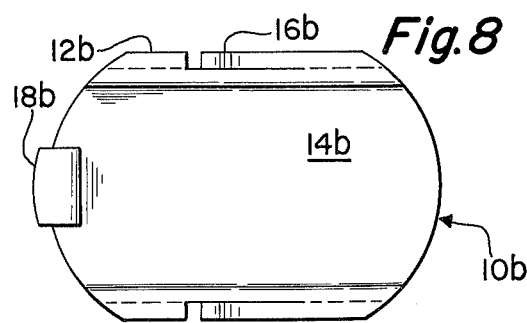
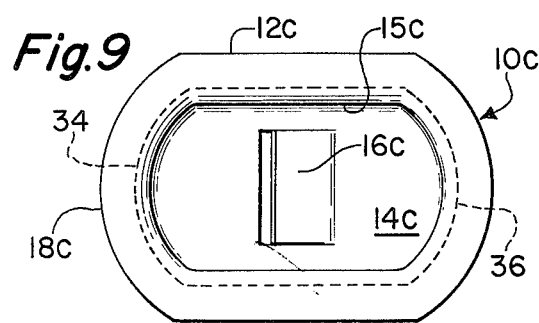
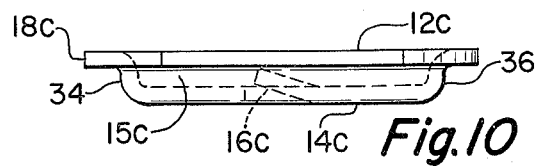
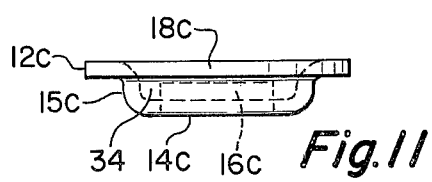

ADHESIVE MOUNTING DEVICE

This invention relates broadly to a system for mounting devices to a work surface by means of adhesive and is more particularly directed to an improved clip and assembly system for mounting a device, such as a rearview mirror, to the interior surface of the windshield of an automobile.

It has become desirable and popular to mount a device, such as a rearview mirror, directly to the interior surface of a windshield in an automobile. Current practices for accomplishing such direct mounting utilize an adhesive bond between a base member and the windshield followed by a mechanical connection between the base member and the device to be mounted. Since such a device is highly susceptible to vibrations, it is desirable to clamp the device to the base member in some manner.

One example of the prior art technique of fastening utilizes a base member with adhesive on one surface and having shoulders at its side edges to allow a mounting member to be slid over the base member. The mounting member usually carries the rear view mirror and the mounting member is clamped in position through the use of a set screw after the base member has been adhesively bonded to the inner surface of a windshield. To insure that the mounting member is secure in the mounted position, the screw must be tightened to such an extent that clamping loads in the system are relatively high. While the adhesive utilized is designed to generally withstand the original clamping load, it usually cannot withstand any increase in clamping loads. Consequently, if the mounting member and base member are of different materials having different coefficients of expansion, a change in temperature could possibly alter the relative dimensions of the two members to such an extent that the clamping load on the base member is appreciably increased. Such an increase in clamping load will cause an accompanying increase in the load on the adhesive bond line. This increase of load on the adhesive will commonly be in the form of peel forces which are the most difficult for an adhesive layer to resist and thus the bond line between the base and the windshield fails, causing the base member and the mirror to become disassociated from the windshield. It is also possible that the differential of coefficient of expansion will cause the clamping force between the mounting member and the base member to diminish thus permitting the assembly to rattle and perhaps become damaged during excessive vibration.

Accordingly, it is primary object of this invention to provide a mounting system which will permit variations in the clamping load within the system once the device has been clamped to the base member and the base member has been adhesively secured to a work surface.

It is another object of this invention to provide an adhesive mounting clip which is capable of absorbing increases in forces tending to peel the clip from the work surface.

A further object of the invention is to provide a mirror mounting assembly wherein a portion of the assembly is adhesively preassembled to the windshield and a second portion of the assembly is removably associated with the first member.

Accordingly, the present invention satisfies the above and other objects and advantages through the provision of a spring member integral with an attaching clip which is adhesively secured to a windshield or the like. The clip is designed to slidably receive a mounting member carrying a device, such as a mirror. The mounting device will typically include a set screw which is tightened against the clip in order to clamp the mounting member to the clip. In the preferred embodiment of the invention, the set screw bears directly on the spring member. The system may thus be preloaded to accommodate any changes in clamping pressure which may result through the differential expansion of the mounting member and base member. In secondary embodiment, the spring portion may be provided between the associated clamping shoulders of the mounting member and clip.

Other objects and advantages will become more apparent during the course of the following description when taken in connection with the accompanying drawings.

BRIEF DESCRIPTION OF THE DRAWINGS

FIG. 1 is a perspective view of base and mounting member of the invention prior to assembly.

FIG. 2 is a top plan view of a preferred embodiment of the clip incorporated in this invention.

FIG. 3 is a side view of the clip shown in FIG. 2.

FIG. 4 is an end view of the mounting member and the base member after they have been assembled and clamped together.

FIG. 5 is a side view of an alternate embodiment of the clip of the present invention.

FIG. 6 is a top plan view of the embodiment shown in FIG. 5.

FIG. 7 is a side view of a further modification of a clip according to the present invention.

FIG. 8 is a top plan view of the clip modification shown in FIG. 7.

FIG. 9 is a top plan view of another embodiment of the invention.

FIG. 10 is a side view of the clip shown in FIG. 9.

FIG. 11 is a front end view of the clip shown in FIG. 9.

DESCRIPTION OF THE PREFERRED EMBODIMENTS

Referring now to the drawings wherein like reference numerals throughout the various views of the drawings are intended to designate similar elements or components.

Turning first ot FIG. 1, there is shown a mounting system comprising a base plate or clip 10 adhered to a surface, such as a portion of a windshield 50, and adapted to slidably receive a mounting member 20. The clip 10 will preferably be preassembled, by an adhesive bond, to the windshield 50 to facilitate handling. The mounting member 20 may subsequently be slid over the clip in the direction of the arrow A and clamped thereon through the use of a set screw 28. A mirror assembly 30 is typically fixed or removably attached to this mounting member 20.

From FIGS. 2 and 3 it will be shown that the clip 10 is generally configured to include a pair of side edges in the form of outwardly extending shoulders 12 which are spaced from a faying surface 17 on a central base surface 14. The clip 10 may advantageously be constructed as a stamping in the form of a channel with the base surface 14 forming the bottom wall and including side walls 15 terminating at the shoulder portions 12. Faying surface 17 of the clip will preferably be provided with a layer of heat activatable adhesive 40 so that the clip may be placed on the windshield 50 and secured thereto, allowing the windshield and the clip to be handled as a unit.

Turning to FIG. 4, there is shown the mounting member 20 associated with and clamped to the clip 10 which is adhesively secured to windshield 50. The side edges and shoulders 12 of the clip, being spaced from the surface of the windshield, are thus adapted to overlie lip portions 22 of the mounting member when the member is slidably associated with the clip. A channel shaped groove 24 above the lips 22 in the mounting member allows the shoulders of the clip to be slidably received in the mounting member. A front stop 18 on the clip and an associated front wall 26 of the mounted member limit the movement of the mounting member relative to the clip and thus serve to position the member relative to the clip. When properly located, the set screw 28 is tightened against the base 14 of the clip in order to draw up the member into clamping engagement with the clip. The direction of the clamping forces exerted on the clip in the system are illustrated in FIG. 4 by arrows F1 and F2. It should be apparent that forces F1 tend to produce a peel stress on the adhesive layer 40. It should also be apparent that if the mounting member is of a material having a different coefficient of expansion from the clip member, there will be a change in the clamping pressure as a result of a change in temperature. For example, if the temperature increases and mounting member 20 has a coefficient of expansion greater than the clip 10, then there would be a lessening of the clamping pressure between the shoulder and the lip portions of the respective members. However, if there is a decrease of temperature, the member 20 will contract relative to member 10, causing an increase in forces F1 on the shoulders 12 of the clip and, of course, an equal and opposite increase in force F2 on the base of the clip 14. Such an increase in clamping force frequently exceeds the designed peel strength of the adhesive bond and tends to cause a failure in the bond.

In actual practice, the mounting member 20 will be of a die cast material which will have a relatively high coefficient of expansion while the clip member 10 will be of a material, such as stainless steel, having a coefficient of expansion less than that of the mounting member. The clip member 10 is preferably constructed from material which has a relatively low coefficient of expansion so as to be consistent with the coefficient of expansion of the windshield glass 50.

The preferred embodiment of the clip 10 shown in FIGS. 1-4, includes a spring-like tab 16 struck up from the bottom wall 14 of the channel shaped structure. This tab 16 is positioned to accept the extremity of the set screw 28. As shown in FIG. 4, the screw 28 is tightened against this tab 16 and the system may thus be preloaded by tightening the screw so that there is a slight downward deflection of the tab. This tab thus provides a spring in the system which will absorb any variance in the clamping pressures F1 and F2. If the clamping pressure in the system decreases, the tab will exert an upward force on the screw as a result of the preloaded condition. This substantially eliminates the possibility that the mounting member 20 will vibrate or will be otherwise free to move relative to the clip after assembly. More importantly, however, the tab 16 will be capable of further downward deflection should the clamping forces increase after the system has been installed. Temperature changes causing changes in dimensions in this system will thus be absorbed by the spring 16.

While the tab is shown as a cantilever-type spring member in the preferred embodiment, it should be apparent that other configurations of springs can be incorporated in the clip. For example, FIGS. 5 and 6 describe such an alternate configuration wherein spring means 16a is in the form of a portion formed upwardly and sheared from the base 14a of the clip. This formed strip will accept an increase in clamping loads as well as provide means to preload the system similar to the spring tab described above.

The embodiment shown in FIGS. 7 and 8 indicates that the spring can be located at other portions of the system where the clamping loads exist. For example, spring 16b, in clip 10b, is formed in the shoulders 12b. The sheared and formed spring 16b may be compressed upon an increase in clamping load in the shoulder area of the clip and thus will function in a manner similar to the other embodiment of the invention. The location of the spring in the shoulders of the clip also provides an uninterrupted faying surface 17b which may enhance the esthetic value of the system in addition to increasing the surface area to be bonded.

The embodiment shown in FIGS. 9-11 includes an upstanding side wall about the entire perimeter of the base surface 14c. Front wall portion 34 and rear wall portion 36 will further strengthen and reinforce the clip 10c against forces such as F1 applied beneath the shoulders 12c tending to peel the base from the support surface. The walls 34 and 36 extending transversely of the clip allows any change in force on the system to be absorbed entirely by the spring tab 16c. The front wall 34 and outwardly extending flange 18c will also serve as an abutment to limit the movement of the mounting member relative to the clip and to accurately position the mounting member on the clip.

The adhesive layer 40 may be of any suitable adhesive composition, however it has been found that for ease of handling and application a heat activatible adhesive, such as polyvinyl butyral resin, is desirable. It should also be understood that a variety of shapes of workpieces may exist, such as a windshield with a slight curvature. Although the preferred embodiments described above show a generally planar bottom wall 14 and faying surface 17, it should be understood that these surfaces can be modified to conform to the surface to be adhered.

Thus, it is apparent that there has been provided, in accordance with the invention, a mounting system which includes a spring that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

I claim:

1. A system for mounting devices to a primary workpiece including a base plate member having one surface adapted to be adhesively secured to the primary workpiece through an adhesive bonding layer, opposing side edges of the base member including shoulder surface means in spaced relationship to the said one surface, a mounting member adapted to be slidably positioned over the base plate, the mounting member including lip portions extending inwardly from the opposite side edges thereof to underlie the shoulder surface means when associated therewith, the opposing lip portions and shoulder surface means forming a first set of opposing clamping surfaces, the means to clamp the mounting member being adapted to bear against a predetermined region of the base plate and thereby forming a second set of opposing clamping surfaces, spring means positioned between at least one set of opposing clamping surfaces and adapted to relieve the stress on the adhesive bonding layer when the system is mounted on the primary workpiece as a result of the clamping pressure between the two members as well as preloading the system.

2. The mounting system as claimed in claim 1 of the type wherein the base plate member and mounting member have different coefficients of expansion causing changes in the clamping pressure between the two elements subsequent to positionment and clamping together wherein the base plate member has a recess formed therein, and includes a bottom wall adapted to be bonded to the primary workpiece, side wall portions upstanding from the bottom wall including outwardly extending flanges forming said shoulder surface means.

3. The mounting system of claim 2 wherein the base plate member is channel shaped.

4. The mounting system in accordance with claim 2, wherein the bottom wall of the base plate member is substantially surrounded by upstanding wall portions.

5. The mounting system in accordance with claim 2, wherein the spring means includes a struck-up portion with the extremities thereof integral with the bottom wall and including an intermediate segment bulged upwardly from the bottom wall and adapted to be resiliently compressed by clamping means when a device is associated therewith.

6. The mounting system as claimed in claim 1 wherein the base plate member and mounting member include abutment means to limit the sliding movement of the mounting member in one direction.

7. The mounting system as claimed in claim 1 wherein the means to clamp the mounting member includes a set screw extending through the mounting member into engagement with the base plate serving to clamp the clip portions and the shoulder surface means together.

8. The mounting system in accordance with claim 7 wherein the set screw bears against the spring means formed in the base plate to resiliently accommodate changes in the clamping pressure between the mounting member and the base plate wherein the stress on the adhesive bond line may remain substantially uniform.

9. The mounting system in accordance with claim 7 wherein the base plate member carries adhesive means on said one surface, said one surface further including the spring means in the form of a struck-up portion positioned intermediate the shoulder surface means.

10. The mounting system in accordance with claim 7 wherein the spring means is provided between the lip portions and shoulder surface means.

11. The mounting system in accordance with claim 10 wherein the spring means is a struck-up tab formed in the shoulder surface means.

* * * * *